United States Patent
Schechter

(10) Patent No.: US 11,438,182 B2
(45) Date of Patent: Sep. 6, 2022

(54) HUMAN- AND MACHINE-READABLE CRYPTOGRAPHIC KEYS FROM DICE

(71) Applicant: DiceKeys, LLC, Cheyenne, WY (US)

(72) Inventor: Stuart Schechter, Seoul (KR)

( * ) Notice: Subject to any disclaimer, the term of this patent is extended or adjusted under 35 U.S.C. 154(b) by 143 days.

(21) Appl. No.: 17/009,665

(22) Filed: Sep. 1, 2020

(65) Prior Publication Data

US 2021/0067354 A1 Mar. 4, 2021

Related U.S. Application Data

(60) Provisional application No. 62/895,985, filed on Sep. 4, 2019.

(51) Int. Cl.
| | |
|---|---|
| *H04L 9/38* | (2006.01) |
| *H04L 9/08* | (2006.01) |
| *G06F 11/10* | (2006.01) |
| *A63F 9/04* | (2006.01) |
| *H04L 67/133* | (2022.01) |

(52) U.S. Cl.
CPC .......... *H04L 9/38* (2013.01); *A63F 9/0415* (2013.01); *G06F 11/1004* (2013.01); *H04L 9/0869* (2013.01); *H04L 67/133* (2022.05)

(58) Field of Classification Search
CPC ......... H04L 9/38; H04L 9/0869; H04L 67/40; A63F 9/0415; G06F 11/1004
See application file for complete search history.

(56) References Cited

U.S. PATENT DOCUMENTS

| | | | | |
|---|---|---|---|---|
| 5,398,285 | A * | 3/1995 | Borgelt | G06F 21/31 380/247 |
| 6,557,852 | B1 | 5/2003 | Cuddy | |
| 7,570,781 | B2 * | 8/2009 | Rhoads | H04N 1/00005 463/16 |
| 7,681,046 | B1 * | 3/2010 | Morgan | G06F 21/72 713/193 |
| 8,726,148 | B1 * | 5/2014 | Battilana | G06F 40/232 715/234 |
| 9,694,275 | B2 * | 7/2017 | Hawkins | A63F 9/04 |
| 11,069,397 | B2 * | 7/2021 | Brox | G11C 11/221 |
| 11,182,244 | B2 * | 11/2021 | Boehm | G06F 12/1425 |
| 2015/0367230 | A1 | 12/2015 | Bradford et al. | |

OTHER PUBLICATIONS

International Search Report in PCT International Application No. PCT/US2020/048961, dated Nov. 24, 2020.

* cited by examiner

*Primary Examiner* — Hosuk Song
(74) *Attorney, Agent, or Firm* — Cognition IP, P.C.; Edward Steakley; Aroon Karuna

(57) ABSTRACT

The systems and methods herein provide for human- and machine-readable cryptographic keys from dice. In one embodiment, the system places a number of dice into an arrangement to fill a dice grid. The number of dice each contains a number of faces, and each of the faces of the dice includes an image. The system then captures, via a client device, an image of the arrangement. The system generates a cryptographic key from the captured image. This cryptographic key is a human-readable and machine-readable representation of the arrangement in a canonical sequence.

23 Claims, 16 Drawing Sheets

Figure 5A

Email Address rand.oh@dicekeys.com

Your Name

Rand Oh

Master Password (use your dice grid)

puma timid easel dean trio party knee

Submit   Cancel

Figure 5G

HUMAN- AND MACHINE-READABLE CRYPTOGRAPHIC KEYS FROM DICE

CROSS-REFERENCE TO RELATED APPLICATIONS

This application claims the benefit of U.S. Provisional Application No. 62/895,985, filed Sep. 4, 2019, which is hereby incorporated by reference in its entirety.

FIELD

The presently described systems and methods relate generally to the field of cryptography, and more particularly, to providing systems and methods for providing human- and machine-readable cryptographic keys from dice.

BACKGROUND

Within the realm of cryptography, a major ongoing challenge is in providing encryption keys which are capable of cryptographically encrypting and securing data in a way that resists circumvention. The problem of creating secure passwords (e.g., for websites, local applications, accessing system administration privileges, or unlocking devices) is one such example where encryption keys play a significant role.

Password managers are often used today for generating passwords for users of computer systems. Password managers use "master passwords" to encrypt all of a user's other passwords, as well as the user's two-factor authentication ("2FA") codes and other secrets. Since password managers promise to manage all of this data for the user and to produce cryptographically strong passwords, they have been popular. The security requirements of password managers necessitate master passwords be long, unpredictable strings the user has never used before, in order to resist guessing attacks and other attempts to circumvent passwords. The downside to the use of master passwords as encryption keys is that if the user forgets or misplaces the master password, there is no way to recover the encryption key, and the user will lose access to their passwords and data. A common problem for users of password managers is that they do not use the master password for an extended period of time, eventually forget it, and cannot recover other passwords as a result. Memorable master passwords are too likely to be vulnerable to guessing attacks, whereas secure master passwords are too likely to be forgotten when users need them.

Thus, there is a need in the field of cryptography for new systems and methods which provide for both human- and machine-readable cryptographic keys which provide secure encryption yet can still be read, understood, and retrieved by a human at a moment's notice. The source of the problem, as discovered by the inventors, is a lack of generated cryptographic keys which can be read and understood by humans, are resilient to guessing attacks, and which allow for, e.g., error checking and other features of robust, cryptographically strong keys.

SUMMARY

The systems and methods described herein provide for human- and machine-readable cryptographic keys from dice. In one embodiment, the system places a number of dice into an arrangement to fill a dice grid. The number of dice each contains a number of faces, and each of the faces of the dice includes an image. The system then captures, via a client device, an image of the arrangement. The system generates a cryptographic key from the captured image. This cryptographic key is a human-readable and machine-readable representation of the arrangement in a canonical sequence.

In some embodiments, the arrangement contains one or more of: a position of each die within the dice grid, an exposed face of each die with respect to the front of the dice grid, and/or an orientation of the exposed face of each die relative to a frame of reference. In some embodiments, the arrangement contains all of these aspects.

In some embodiments, the arrangement is generated via a random process. In some embodiments, the arrangement of the dice grid is locked such that the arrangement cannot be altered. In some embodiments, the cryptographic key includes one or more of: a binary representation of the arrangement, and a string representation of the arrangement. In some embodiments, each image on the die faces includes one or more letters, numbers, and/or symbols associated with a portion of the cryptographic key. In some embodiments, each image on the die faces comprises an overline and/or an underline representing a plurality of data bits associated with a portion of the cryptographic key.

In some embodiments, the system sends, to the client device, a prompt for a user to manually identify or verify one or more visible images on the die faces exposed on the dice grid based on the captured image of the arrangement. In some embodiments, the system performs one or more error detection checks based on the captured image of the arrangement.

In some embodiments, the canonical sequence is based on a set of rules determining at least: a starting die, an upright position for each die based on the image on the die face which is visible for that die, and a reading order from the starting die to an ending die.

In varying embodiments, the cryptographic key can be put to various uses once generated. For example, in some embodiments, a secret is derived from the cryptographic key to seed an authenticator device or application running an authentication-based or cryptographic protocol. In some embodiments, a password is derived from the cryptographic key (such as a master password). In some embodiments, the system uses an application-specific cryptographic key derived from the cryptographic key in an end-to-end encrypted application as a primary authentication or encryption key or to back up a primary authentication or encryption key. In some embodiments, the system uses an application programming interface (API) to enable a third-party application to derive keys or other secrets from the cryptographic key or perform operations with a derived cryptographic key without enabling access to the cryptographic key or the derived cryptographic key.

In some embodiments, the image on each of the die faces of the plurality of dice includes one or more text characters; and an encoding of data into a line below the text characters and a line above the text characters, such that the encoding in each individual line replicates the data in the text, and contains information sufficient to determine the size and position of both the location of the text and the other line. In some embodiments, the encoding of data includes a number of 0 bits and 1 bits, and an error correction code is generated from the encoding of data, where the number of 0 bits and 1 bits in the encoding of data is constrained such that all possible encodings have a minimum number of 0 bits and 1 bits, and a grayscale threshold is exceeded for one or more of the 0 bits and 1 bits in order to identify the lines as black or white. In some embodiments, an error correction code is generated from the encoding of data, where some of the 0 bits and 1 bits are inverted copies of other bits so as to catch all errors in which the 0 bits and 1 bits in a region of the encoding of data are either falsely set as 1 to 0 or cleared as 0 to 1.

The features and components of these embodiments will be described in further detail in the description which follows. Additional features and advantages will also be set forth in the description which follows, and in part will be implicit from the description, or may be learned by the practice of the embodiments.

BRIEF DESCRIPTION OF THE DRAWINGS

FIG. 5A is an example of using a generated cryptographic key to generate a password, in accordance with some embodiments.

FIG. 5G is an example of using a generated cryptographic key to generate a password, in accordance with some embodiments.

DETAILED DESCRIPTION

Figure 1A:
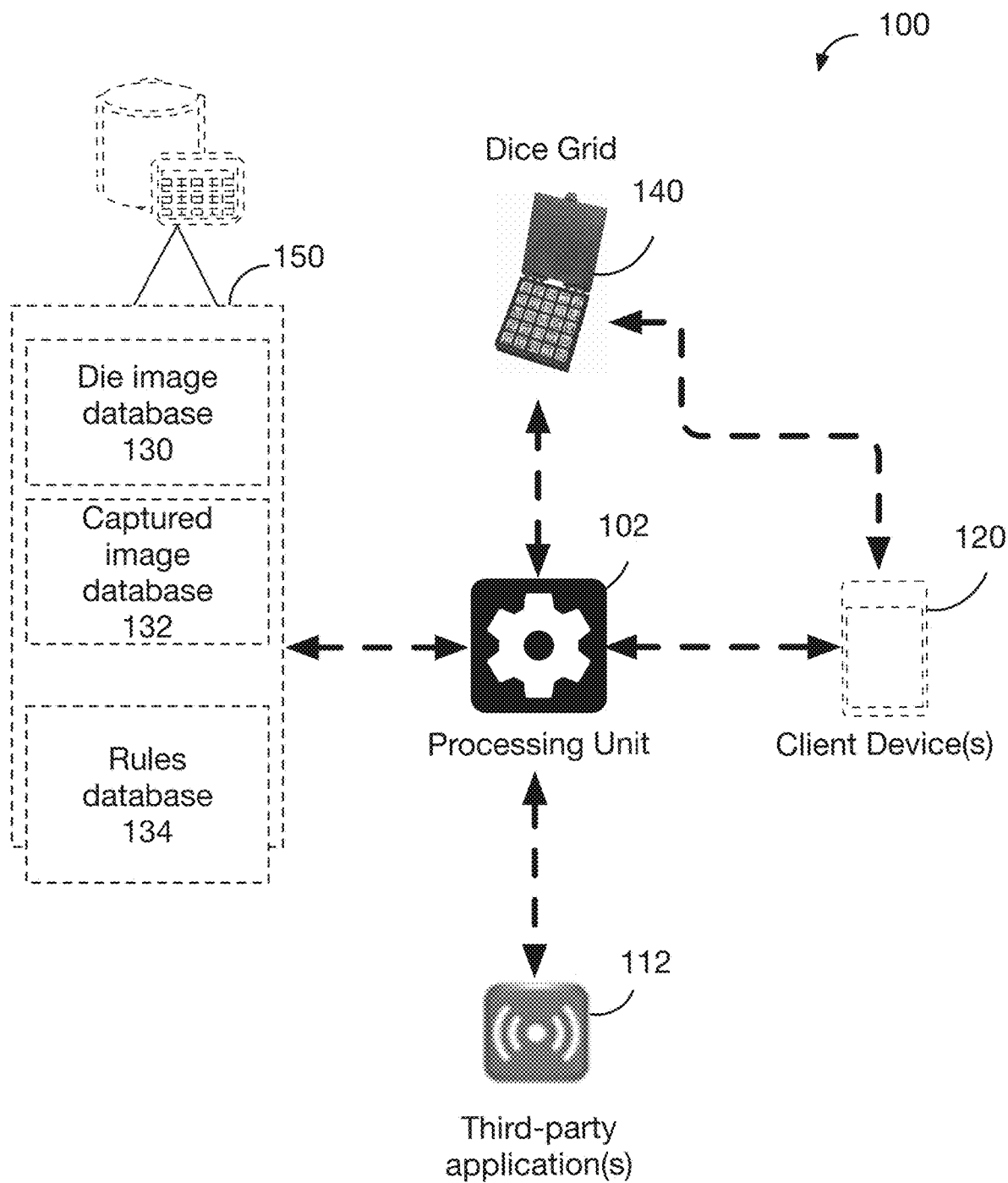
FIG. 1A is a diagram illustrating an exemplary system for providing a cryptographic key from dice, in accordance with some embodiments.

In this specification, reference is made in detail to specific examples of the systems and methods. Some of the examples or their aspects are illustrated in the drawings.

For clarity in explanation, the systems and methods herein have been described with reference to specific examples, however it should be understood that the systems and methods herein are not limited to the described examples. On the contrary, the systems and methods described herein cover alternatives, modifications, and equivalents as may be included within their respective scopes as defined by any patent claims. The following examples of the systems and methods are set forth without any loss of generality to, and without imposing limitations on, the claimed systems and methods. In the following description, specific details are set forth in order to provide a thorough understanding of the systems and methods. The systems and methods may be practiced without some or all of these specific details. In addition, well known features may not have been described in detail to avoid unnecessarily obscuring the systems and methods.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

I. Benefits

Various embodiments of the systems and methods described herein can confer a number of benefits over the previous attempts to address the problems elucidated above. Similarly to passwords, the cryptographic keys generated by the systems and methods herein can be read and understood by both humans and machines. While these human- and machine-readable cryptographic keys share this similarity with passwords, they provide several benefits over passwords. First, in some embodiments, they are capable of providing error-checking to ensure, for example, that the key material is not being read or transcribed incorrectly. Second, the cryptographic keys are fixed in a longer-lasting storage medium, namely, by virtue of using pre-printed images on mediums such as, e.g., plastic or metal, they may be less vulnerable to moisture and other elements than paper or other user-writable media. Third, they provide much greater resilience to guessing attacks because they can be longer and more random than passwords that users must memorize.

Human- and machine-readable keys generated via physical processes also present several benefits over other physical storage media for passwords and cryptographic keys. First, by nature of being human-readable, they can be replicated by humans for the purpose of making a backup, then the backup can be machine-verified because the replica is also machine-readable. Second, the medium is not an electronic device, and thus contains no circuits which are prone to degradation over time. Third, the non-electronic nature of dice grids has the advantage of never becoming obsolete in ways that electronic devices (e.g., devices with firmware requiring regular updates) will eventually become.

Human- and machine-readable cryptographic keys are also robust enough to be used in various contexts. For example, when paired with a dedicated device or app, they may be used to: generate passwords, such as a master password for a password manager service; seed FIDO or other security keys so that they can be replaced with cryptographically-identical replicas if lost; ensure continuity of access to data stored in an end-to-end encrypted application; and encrypt or decrypt data on behalf of third-party applications without revealing the keys to those third-party applications; or any other suitable context.

The benefits elucidated above will be described in further detail throughout.

II. Exemplary Environments

FIG. 1A is a diagram illustrating an exemplary environment in which some embodiments may operate. In the exemplary environment 100, a dice grid 140 is connected to a processing unit 102. The processing unit 102 is optionally connected to one or more optional database(s) 150, including a die image database 130, captured image database 132, and rules database 134. One or more of the databases may be combined or split into multiple databases. The processing unit 102 is optionally connected to a client device 120 and third-party application server(s) 112. One or more of these components may be a computer system, part of a computer system, or hosted on a computer system.

The exemplary environment 100 is illustrated with only one client device, processing unit, and dice grid for simplicity, though in practice there may be more or fewer client devices, processing units, and/or dice grids. In some embodiments, the client device and processing unit may be part of the same computer or device.

In an embodiment, the processing unit 102 may perform the method 200 or other method herein and, as a result, provide for cryptographic keys from dice (hereinafter "cryptographic keys" or "keys"). In some embodiments, this may be accomplished via communication with the client device 120, third-party application server(s) 112, and/or other device(s) over a network and one or more servers (e.g., application servers and/or network servers). In some embodiments, the processing unit 102 is an application hosted on a computer or similar device, or is itself a computer or similar device configured to host an application to perform some of the methods and embodiments herein. The processing unit 102 is further configured to capture information from a physical dice grid 140. This may include processing the dice grid to parse information, and potentially other steps as will be described further below. In some embodiments, the processing unit 102 may have one or more cameras, scanners, sensors, and/or other built-in components configured to capture image(s) of the dice grid.

Optional client device 120 is a device that sends and receives information to the processing unit 102. In some embodiments, client device 120 is a computing device capable of hosting and executing one or more applications or other programs capable of sending and receiving information. In some embodiments, the client device 120 may be a mobile device (such as, e.g., a smart phone or tablet), computer desktop or laptop, virtual reality or augmented reality device, wearable, or any other suitable device capable of sending and receiving information. In some embodiments, the processing unit 102 may be hosted in whole or in part as an application executed on the client device 120. The client device may also be configured to interact with the dice grid 140 by capturing one or more images on the die faces exposed on the dice grid. In some embodiments, client device 120 may have one or more cameras, scanners, sensors, and/or other built-in components configured to capture image(s) of the dice grid.

Third-party application(s) 112 are applications from one or more third parties which are configured to communicate through or with the client device 120 and/or processing unit 102, and which may provide one or more functions while utilizing cryptographic keys generated from dice grids. In varying embodiments, the third-party application(s) 112 are hosted on the client device and/or one or more additional devices. In some embodiments, third-party application(s) may communicate and interface with the processing unit 102 and/or client device 120 by an Application Programming Interface (API) or other means of interfacing. In some embodiments, the third-party application(s) 112 may utilize and/or be hosted on one or more remote servers which connect to the processing unit 102 and/or client device 120.

Optional database(s) include one or more of a die image database 130, captured image database 132, and/or rules database 134. These optional databases function to store and/or maintain, respectively, images on die faces exposed on dice grids, captured images of dice grids, and/or rules for generating cryptographic keys based on a canonical sequence. Other optional database(s) may be contemplated for other pieces of data throughout the system. In some embodiments, the optional database(s) can be queried by one or more components of system 100 (e.g., by the processing unit 102), and specific stored data in the database(s) can be retrieved. In some embodiments, one or more of the optional databases (such as the scan database) are configured to encrypt or remove sensitive information after one or more given tasks are performed by the processing unit 102.

Dice grid 140 is a physical set of dice placed within a container which secures the dice in place in a certain configuration. The dice are placed in an arrangement to fill the dice grid 140. The dice each contain a number of faces (e.g., 6 faces per die), and each of the die faces on the dice contains an image visible on it. In some embodiments the dice each contain an equal number of faces (e.g., each die has exactly 6 faces), while in other embodiments the dice can contain an unequal or arbitrary number of faces relative to other dice (e.g., twelve dice may have 6 faces, six dice may have 9 faces, and nine other dice have 21 faces). In some embodiments, the dice may have an arbitrary number of die faces. In some embodiments, any single-faced dice are flat and comprise a side with a face and a side without a face. In some embodiments, any two-faced dice are flat and comprise two sides each having a face. In some embodiments, any six-sided dice are represented as cubes with rounded corners.

The dice grid 140 functions to provide a physical, fixed medium by which dice can be placed (e.g., via a random process such as a dice throw) into a sequence, with the visible images from the die faces being read by the processing unit in a particular canonical sequence in order to generate a cryptographic key.

These components will be described in further detail with respect to the methods below and generally throughout.

Figure 1B:
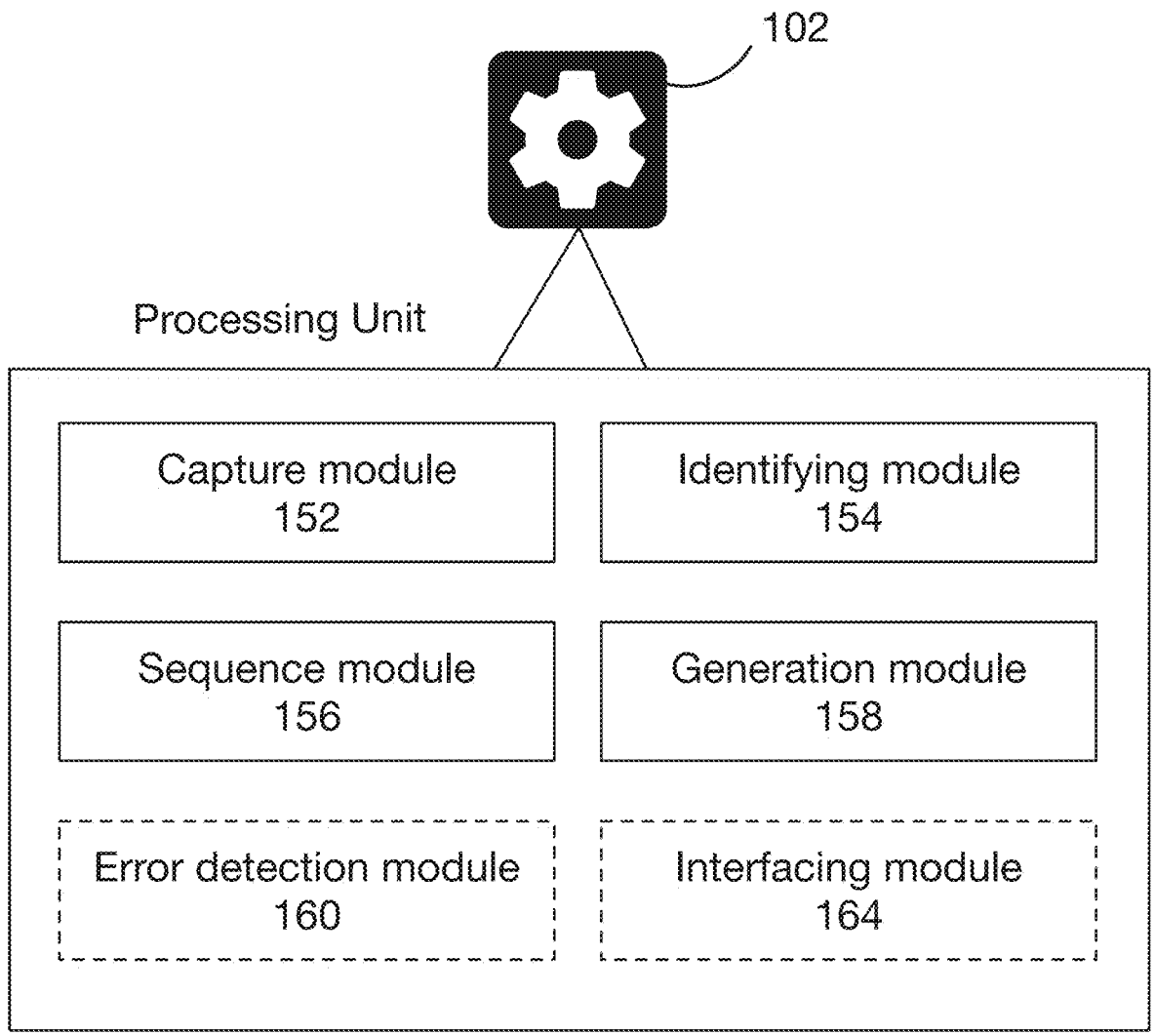
FIG. 1B is a diagram illustrating an exemplary computer system for providing a cryptographic key from dice that may execute instructions to perform some of the methods therein.

FIG. 1B is a diagram illustrating an exemplary computer system that may execute instructions to perform some of the methods therein. The diagram shows an example of a processing unit 102 configured to provide a cryptographic key. Processing unit 102 may be an example of, or include aspects of, the corresponding element or elements described with reference to FIG. 1A. In some embodiments, processing unit 102 is a component or system on an enterprise server. In other embodiments, processing unit 102 may be a component or system on client device 120, or may be a component or system on peripherals or third-party devices. Processing unit 102 may comprise hardware, software or both.

In the example embodiment, processing unit 102 includes capture module 152, parsing module 154, sequence module 156, generation module 158, error detection module 160, and/or interfacing module 164.

Capture module 152 functions to capture, and/or assist with capturing, visual images, visual information, and other data from a dice grid. For example, capture module 152 can enable a client device, such as a smart phone, to take a picture of the dice grid with an image on each die face exposed and visible, and send the picture on to one or more components of the system for processing.

Identifying module 154 functions to identify, recognize, parse, or otherwise understand (on a machine level and, optionally, human level) visual data from an image or other visual capture of the dice grid. For example, identifying module 154 can be configured to process an image on each die face visible on the dice grid in order to read into the system the data (e.g., alphanumeric and/or symbolic data) present on the image.

Sequence module 156 functions to establish a canonical sequence by which the configuration of the dice in the dice grid are to be read by the processing unit. In some embodiments, one or more rules in a rule set are used to establish the canonical sequence.

Generation module 158 functions to generate a cryptographic key from the captured image of the arrangement and the identified images on the die faces exposed on the dice grid.

Optional error detection module 160 functions to detect one or more errors during step(s) of the methods described herein. For example, error detection module 160 may detect an error in an inaccurate identification of an image, and then provide notification of the error to the system and/or proceed with an alternate method for identifying the image.

Optional interfacing module 164 functions to interface with one or more third-party application servers, such as, e.g., via an API or other means of interfacing.

The above modules will be discussed in further detail with respect to the steps of method 200 below.

III. Methods

Figure 2A:
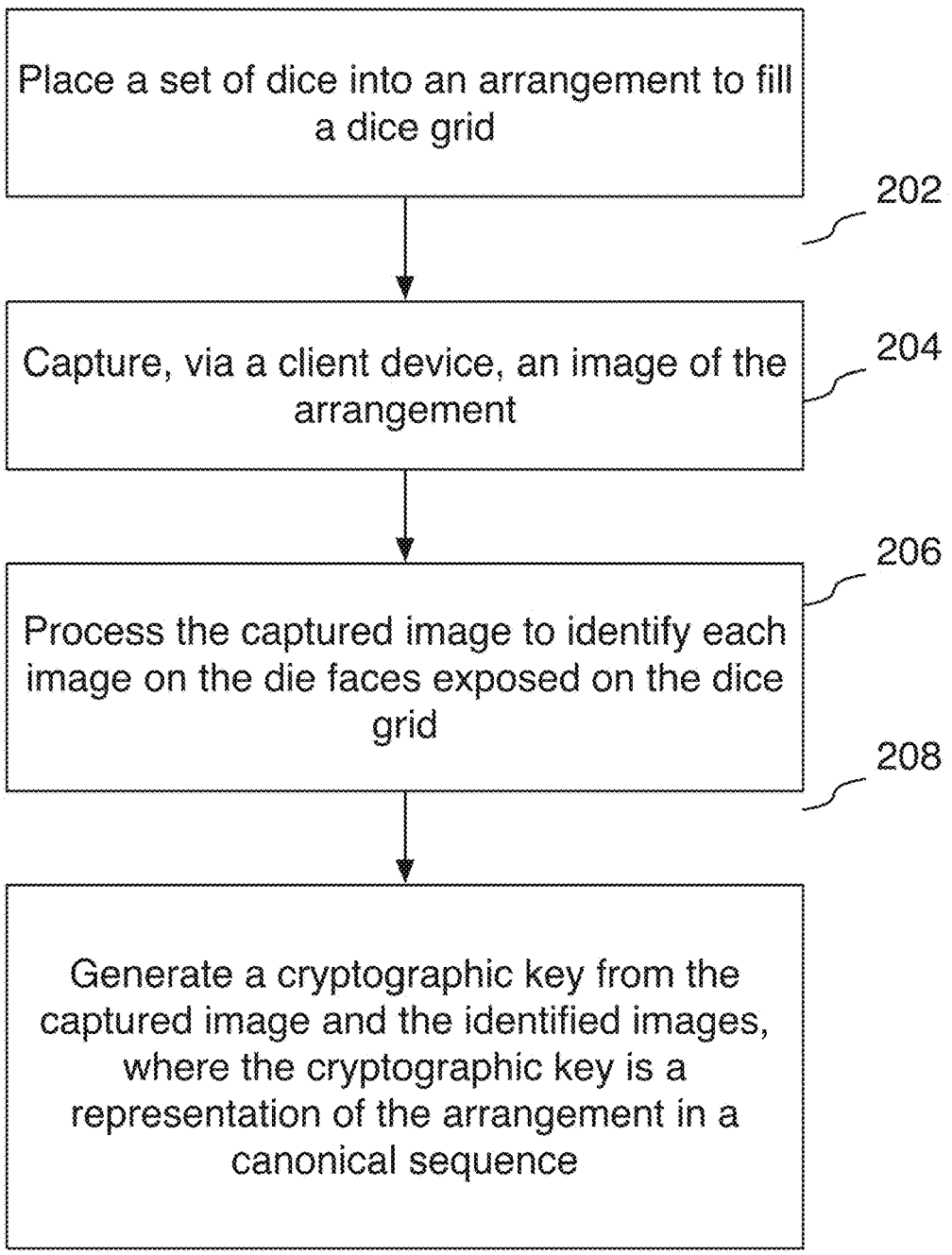
FIG. 2A is a flow chart illustrating an exemplary method for providing a cryptographic key from dice, that may be performed in accordance with some embodiments.

FIG. 2A is a flow chart illustrating an exemplary method that may be performed in accordance with some embodiments. The flow chart shows an example of a process for providing a cryptographic key from a dice grid. In some examples, these operations may be performed by a system including a processor executing a set of codes to control functional elements of an apparatus. Additionally or alternatively, the processes may be performed using special-purpose hardware. Generally, these operations may be performed in accordance with some aspects of the systems and methods herein. For example, the operations may be composed of various substeps, or may be performed in conjunction with other operations described herein.

At step 202, the system (e.g., a user within the system) places a set of dice into an arrangement to fill a dice grid. In some embodiments, the set of dice each contain an equal number of faces, and each of the die faces of the set of dice includes an image visible on the face that is facing outwards to the viewer of the dice grid. In some embodiments, the arrangement contains: a position of each die within the dice grid; an exposed face of each die with respect to the front of the dice grid, and an orientation of the exposed face of each die relative to a frame of reference. In some embodiments, the arrangement is generated or determined via a random process. For example, a user may throw the dice into a box for the dice grid, thus creating the random arrangement of the dice within the dice grid.

Figure 3:
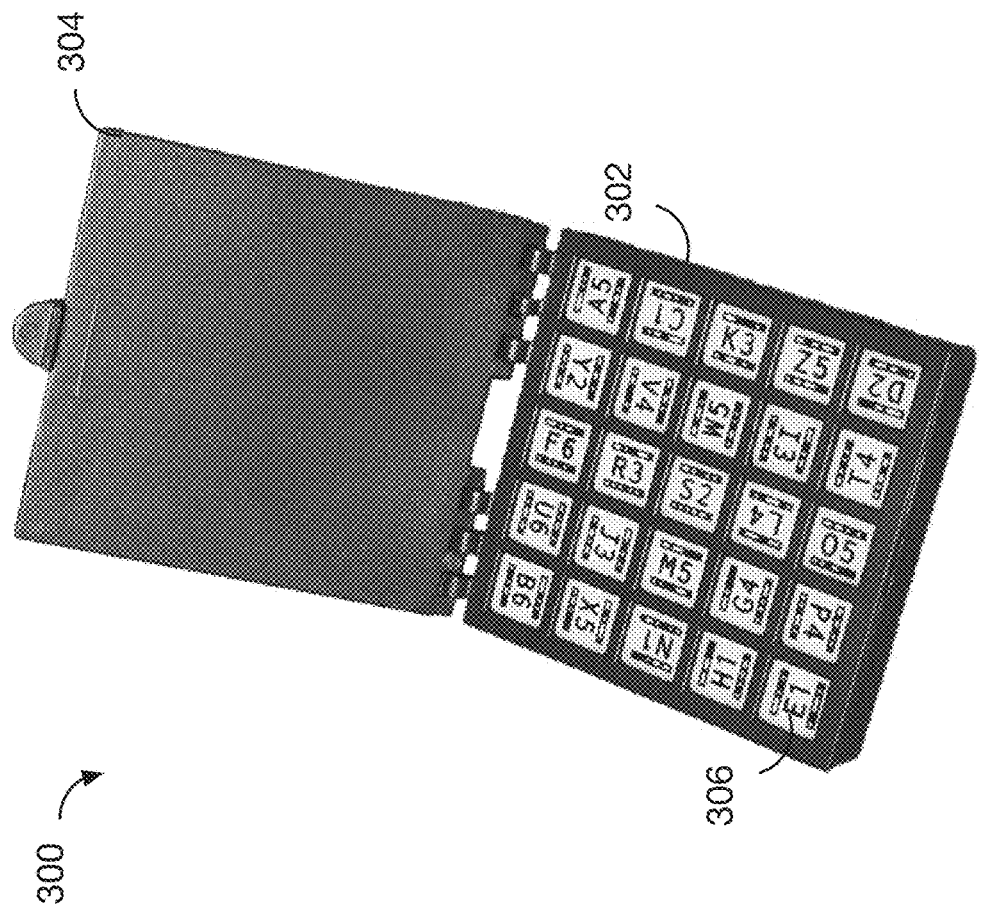
FIG. 3 is a diagram illustrating an example of a dice grid, in accordance with some embodiments of the present invention.

FIG. 3 is a diagram illustrating an example of a dice grid 300, in accordance with some embodiments of the present invention. The embodiment in this example uses a set of 25 dice which are placed into a container (e.g., a box or any other suitable container, made of any suitable material) for the dice. In varying embodiments, an arbitrary number (e.g., 12, 20, 26, or any other suitable number of dice) can be used for the set of dice. The box in the example is a 5×5×1 box with 25 slots for placing the 25 dice, such that the box appears in a square form. In other embodiments, the box may be configured in any other suitable dimension with any other suitable number of slots for dice, including, for example, rectangular dimensions (e.g., 8×3×1) or even a straight line (e.g., 20×1×1). The box in the example exposes a 5×5 square grid of die faces, with one face 306 of each die exposed. Each face 306 of each die includes an image which is exposed and visible from the top of the dice grid. No other faces other than the one visible face are exposed for any given die placed in the dice grid. In some embodiments, any die of any size or number of faces may be used, as long as the dice are all of the same size and the features are scaled proportionately. In some embodiments, the images on each die face contain one or more letters, numbers, and/or symbols associated with a portion of the cryptographic key.

In some embodiments, there may be a locking mechanism 304 which operates to latch the dice grid area 302 shut and lock it. In some embodiments, once the dice grid is locked, it cannot be reopened. In some embodiments, the dice grid may be unlocked via one or more unlocking processes, such as security measures or keys.

In the example embodiment, each die face image contains two characters, a letter followed by a digit, which are sandwiched between a line below them ("underline") and a line above them ("overline"). Each of the underline and overline represents a plurality of data bits (represented as, e.g., dots on the underline and overline) associated with a portion of the cryptographic key, which the system is configured to identify in a machine-readable fashion. The letter and digit are centered on the die, with the letter just left of center and digit just right of center, with a set amount of horizontal space between them. Each of the 25 dice in the example has a unique letter, with the same letter appearing on all six faces of a die. The 25 letters that uniquely identify each die are: A, B, C, D, E, F, G, H, I, J, K, L, M, N, O, P, R, S, T, U, V, W, X, Y, and Z. The six faces (i.e., sides) of every die are labeled with the digits: 1, 2, 3, 4, 5, and 6. The letter and digit may be engraved on the face of the die, overlaid on top of the die, printed or painted on the die, or otherwise present on the die. Generally, the underlines and overlines can be configured to establish orientation of the dice so that the processing unit 102 can determine which side is up and which character is a letter (e.g., the character just left of center) or a digit (e.g., the character just right of center).

As mentioned above, each letter/digit pair is sandwiched between an overline above it and underline below it. In some embodiments, the overline and underline appear as rectangles. The lines and their functions will be described in further detail below.

Returning to FIG. 2, at step 204, the system captures, via a client device, an image of the arrangement. In some embodiments, the image is captured via a camera, such as a built-in camera of a smartphone or other mobile device. In some embodiments, the image is captured via a scanner or other scanning device. Any other form of capturing an image may be contemplated. The captured image is such that the side of the dice grid with the exposed die faces is captured, not the other sides where the die faces are not exposed.

At step 206, the system processes the captured images to identify an image on the face of each die. In various embodiments, the image may be identified, recognized, parsed, or otherwise determined in a machine-readable and/or human-readable way. In some embodiments, optical character recognition ("OCR") and/or any other suitable character recognition techniques may be used. In some embodiments, computer vision or other artificial intelligence techniques may be used in whole or in part.

In some embodiments, the system may ask users to manually verify or identify the results of the identification algorithm, particularly if there is a discrepancy between the different encodings used to identify the image of a given die face, e.g., the overline, the underline, and/or the human-readable characters. The system may prompt users to confirm what was identified, to do so for those dice on which the readings of the encodings (e.g., underline, overline, characters) did not match, or only when there is not a majority that match.

In some embodiments, an application using human- and machine-readable cryptographic keys from the methods herein may opt for more user confirmation when performing an operation in which a misread character will not be detected, such as encrypting data or storing a key, and require less confirmation when a failure will be detected if the key was misread (e.g., for a decryption or authentication operation) and that failure is unlikely to cause harm.

At step 208, the system generates a cryptographic key (or "key") from the captured image and the identified images on the faces of each die, where the cryptographic key is a representation of the arrangement in a canonical sequence. Such keys, which reflect human constructs and are often then used to derive other keys, may also be known as "seeds". In some embodiments, the canonical sequence is determined according to a set of rules for ordering the die in a particular sequence. In some embodiments, the set of rules are capable of determining at least: a starting die within the dice grid; an upright position for each die based on the image exposed on the dice grid for that die; and a reading order from the starting die to an ending die within the dice grid.

Regarding orientation of the dice in the grid in this example embodiment with 6-sided dice, four orientations for each die may be possible based on the captured image with the die faces exposed. In some embodiments, the rules for the canonical sequence can stipulate that the top left die of the dice grid is to be determined as the corner die with the letter character that is earlier in the alphabet than the letters on the three other corner dice. In the example of FIG. 3, between the corner dices B6, A5, E1, and D2, the top left die is determined to be A5 as it contains the letter that is earliest in the alphabet. Adopting an orientation convention obviates the need to require that the box holding the dice have a physical orientation indicator, or a need for algorithms that read cryptographic keys to correctly recognize such an orientation indicator. In some embodiments, once the top left die has been determined, the dice are then assigned indices from top to bottom, with each row ordered left to right. In a 5×5 grid, the canonical sequence may be such that the top row, starting with the top left die, is read from left to right, then the second row is read from left to right, and so on until the bottom right die is read as the last die in the canonical sequence.

In one example, the orientation of each individual die face within the dice grid is represented as a digit from 0 to 3. Based on the rules for canonical sequences, a 0 indicates a die that is upright to the top of the dice grid. The digits 1-3 represent the number of 90-degree clockwise turns required to put an upright die into the correct orientation. In other words: 0 indicates the die is upright when the 5x5 grid is viewed at its canonical rotation; 1 indicates the die is facing right (1 turn clockwise 90-degree turn); 2 indicates the die is up-side down (2 turns, yielding 180 degrees); 3 indicates the die is facing left (3 turns clockwise 90 degrees, yielding 90 degrees counterclockwise).

In some embodiments, the cryptographic key is represented as a binary representation of the arrangement. This binary representation is efficient for transforming the cryptographic key into other representations, such as, e.g., hexadecimal digits, a QR code, a sequence of words, or any other suitable representation of the cryptographic key. In the example of FIG. 3, the 25 dice in the dice grid have $6^{25}$ possible sequences of digits, $4^{25}$ possible sequences of orientations, and 25! possible orderings of the 25 letters. Given an array of orientations represented as numbers 0 to 3, the numeric representation of all 25 orientations is:

$$\text{orientations}^{25} = \text{sum}[i \text{ from } 0 \ldots 24] \text{ of orientation}[i] * 4^{(24-i)}$$

The numeric representation of the 25 digits (die faces) showing is:

$$\text{digits}^{25} = \text{sum}[i \text{ from } 0 \ldots 24] \text{ of digit}[i] * 6^{(24-i)}$$

Given a function rank(letters, i), which returns the index of letter[i] in an alphabetically-sorted array of all characters excluding letter[0] ... letter[i−1], the numeric representation of the 25 letters is:

$$\text{letters}^{25} = \text{sum}[i \text{ from } 0 \ldots 23] \text{ of rank(letters},i)* (25-i)!$$

In embodiments with 25 dice each with a unique letter, there is no need to encode the 25th letter (index 24) as its identity can be determined deductively, i.e., it is the letter that remains when removing the set of the first 24 letters from the alphabet of 25 possible letters. The numeric representation of a 5×5 grid of die faces is:

$$\text{key} = (((\text{letters}^{25} * 6^{25}) + \text{digits}^{25}) * 4^{25}) + \text{orientations}^{25}$$

While there are over $2^{198}$ possible arrangements of 25 unique dice, only one fourth are in canonical form (with die 0 having the letter with a lower sort order than die 4, 20, and 24), and so there are closer to $2^{196}$ possible cryptographic keys in canonical form. Regardless, the numeric representation in this particular example requires 50 bytes to store or transmit.

In some embodiments, the cryptographic key can be represented in human-readable string form. A string-based representation of a cryptographic key can be easier for humans to read than a numeric form, and can allow for encodings of keys that are invalid in space-efficient form. For example, if a user constructs a cryptographic key from a set of non-unique dice, such as one with two T dice and no U die, the numeric or binary form cannot be used to encode the result.

In one example embodiment, the cryptographic key's string-based representation is a 75-character UTF8 string, made up of 25 3-character triples, each of which represents one die. The triples are ordered in the order of the dice in canonical form (index 0 to 24). The first two characters of each triple are the two characters that appear on the dice, from left to right. The first character of the triple is the letter that appears on the die. The second character of the triple is the printed digit that appears on the die, from '1' to '6'. The third character of the triple is the orientation, as character '0', '1', 2', or '3', with each readable digit mapping to the numeric representation of orientation used in numeric form. In other words, '0' is upright, '1' facing right (1 clockwise turn of 90 degrees), '2' is upside-down (2 turns), and '3' facing left (3 clockwise turns). In some embodiments, this representation can also be used for variants that employ other character pairs to represent each die face (including, e.g., those from other languages).

Error Checking and Detecting

In some embodiments, one or more error checks are performed by the system based on the captured image of the arrangement. In some embodiments, the lines above and below the characters in the images of the die face, i.e. the overline and underline, are configured to enable the system to detect and/or correct errors in identifying or recognizing the characters on the die faces.

One example embodiment for detecting errors follows. The underline and overline rectangles encode 11 bits of data into rectangles of height 0.5 mm, which are white to represent 1 (one) bits or black (i.e., absent) to represent 0 (zero) bits. The leftmost bit is always white (1) and the rightmost bit is always black (0). This ensures that, no matter what angle the line appears in, the system can identify the left side of the line as the side with a white rectangle closest to the edge. The second leftmost rectangle is black (0) for underlines and white (1) for overlines. The remaining 8 rectangles encode a byte, with the most significant of the eight bits on the left (the third rectangle location) and the least significant bit on the right (the tenth rectangle location).

If an underline or overline cannot be read, there should be enough data on an overline to know which letter and digit appear on the die—so long as the overline was read correctly. Similarly, if the overline is missing but the underline is read and read correctly, the system can determine which letter and digit were read. This leads to the following requirements for byte encodings: (1) each face must have a unique underline byte, and (2) each face must have a unique overline byte. An algorithm reading the line will need to select a grayscale threshold below which a rectangle will be deemed black and at/above which it will be deemed white. The threshold can be calculated more reliably if the algorithm being used to calculate can assume there are least x black rectangles in a sample and y white rectangles in a sample. For the 11-positions where white rectangles may occur on a line, it is required that at least four should be black and at least four should be white. Since all underlines and overlines have one white rectangle for orientation, and overlines have a second white rectangle to indicate they are overlines, the following are requirements for the underline and overline bytes: (1) all underline bytes must have between 3-6 one bits (2-5 zero bits), and (2) all overline bytes must have between 2-5 one bits (3-6 zero bits). Thus, samples of dice rectangles can be assumed to fit a bimodal distribution (around grayscale values for black and white rectangles) with at least four points at each mode.

Lastly, in this embodiment, one aim is to minimize the chance that errors will lead the underline byte and overline byte to return the same wrong answer (the same incorrect letter/digit pair). The system can be configured to maximize the number of bits that must be read in error for such an error to occur. To ensure at least four bits must be read in error to cause the underline and overline to agree on the same incorrect value, the following requirement is imposed: the 16-bit concatenation of the underline and overline bytes on each die face must be at least a hamming distance of four from that of every other die face.

In this example embodiment, the underline and overline codes are generated based partly on techniques from Hamming (15, 11) codes, which encode 11 data bits with four parity bits. 8-bit messages are used (8 data bits), so the four parity bits of the hamming code are calculated with the last three data bits (d9-d11) set to zero. A fifth and final parity bit (pa) is the xor of all eight data bits and the four previous parity bits:

p1=d1^d2^d4^d5^d7
p2=d1^d3^d4^d6^d7
p4=d2^d3^d4^d8
p8=d5^d6^d7^d8
pa=d1^d2^d3^d4^d5^d6^d7^d8^p1^p2^p4^p8;

For an 8-bit candidate underline byte [d1, d2, d3, d4, d5, d6, d7, d8], the overline is generated as the 3 data bits, each negated, followed by the five parity bits.

underlineByte=[d1, d2, d3, d4, d5, d6, d7, d8]
overlineByte=[~d1, ~d2, ~d3, p1, p2, p4, p8, pa]

The reason the three data bits are negated in the overline is to ensure that, if there are any system errors biasing all values to one or zero in underlines or overlines, that such errors will ensure the underline and overline codes do not decode to the same die face. Not all values represent valid underline bytes. Rather, underline bytes are enumerated starting from 0 (which is not valid) and only use those underline bytes that meet all the above requirements. The first valid underline byte represents A1, the second valid underline value represents A2, the seventh B1, etc.

Example Uses

Figure 2B:
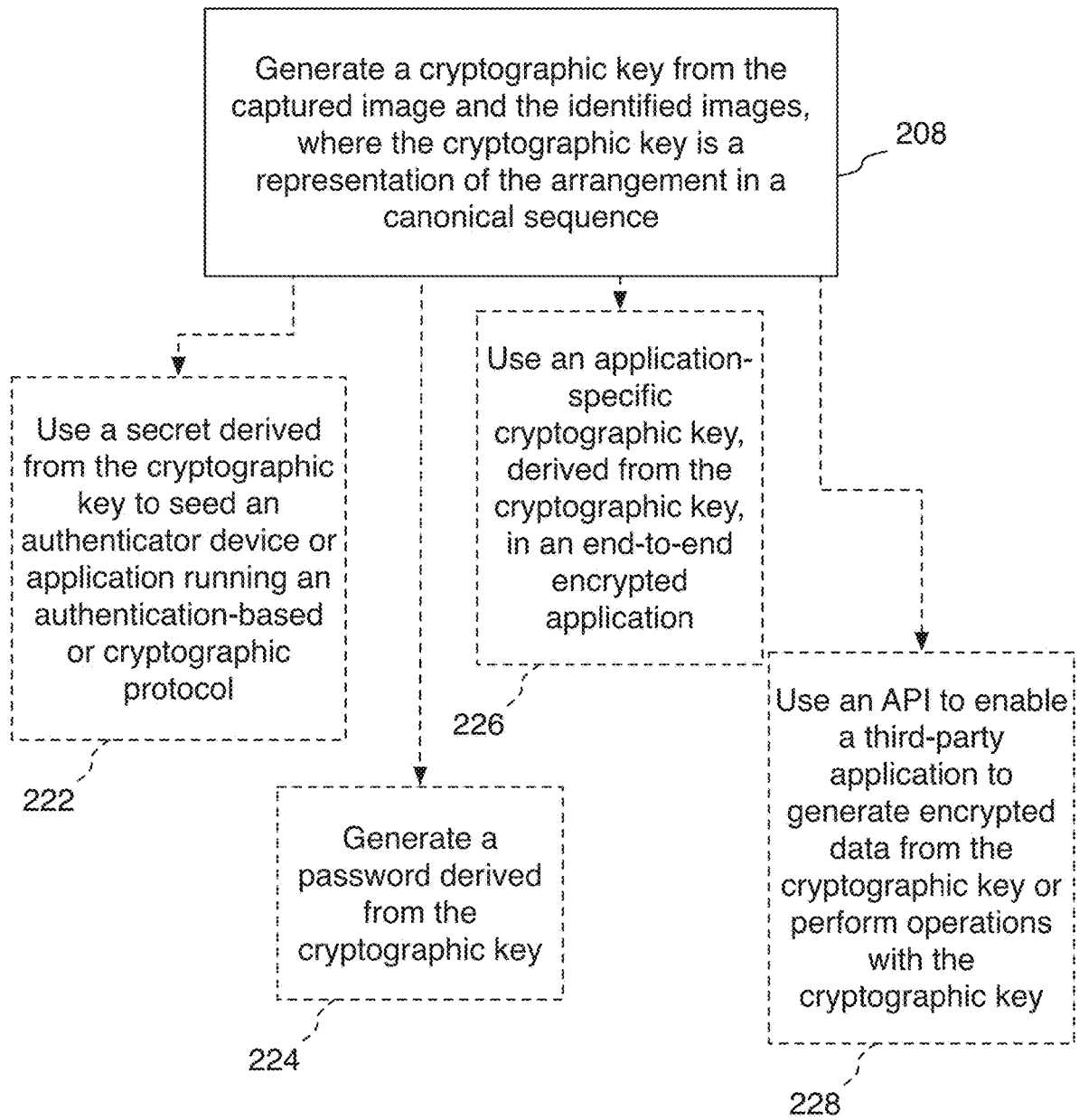
FIG. 2B is a flow chart illustrating additional steps for providing a cryptographic key from dice.

Once a cryptographic key is generated, it can be put to many potential uses either directly or as a seed from which other keys are generated. FIG. 2B is a flow chart illustrating additional steps for providing a cryptographic key from dice, in accordance with some embodiments. Step 208 is described above with respect to FIG. 2A.

At optional step 222, the system uses a secret derived from the cryptographic key to seed an authenticator device or application running an authentication-based or cryptographic protocol.

Figure 4A:
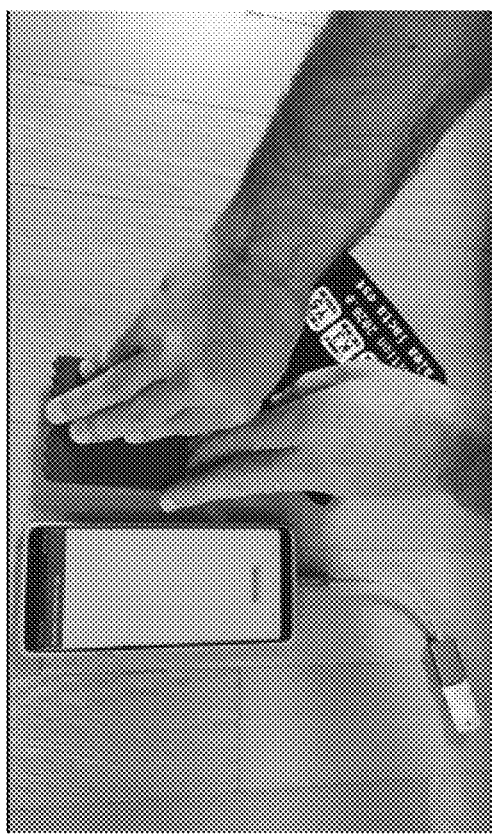
FIG. 4A is an example of using a generated cryptographic key to seed an authenticator device, in accordance with some embodiments.
Figure 4B:
FIG. 4B is an example of using a generated cryptographic key to seed an authenticator device, in accordance with some embodiments.
Figure 4C:
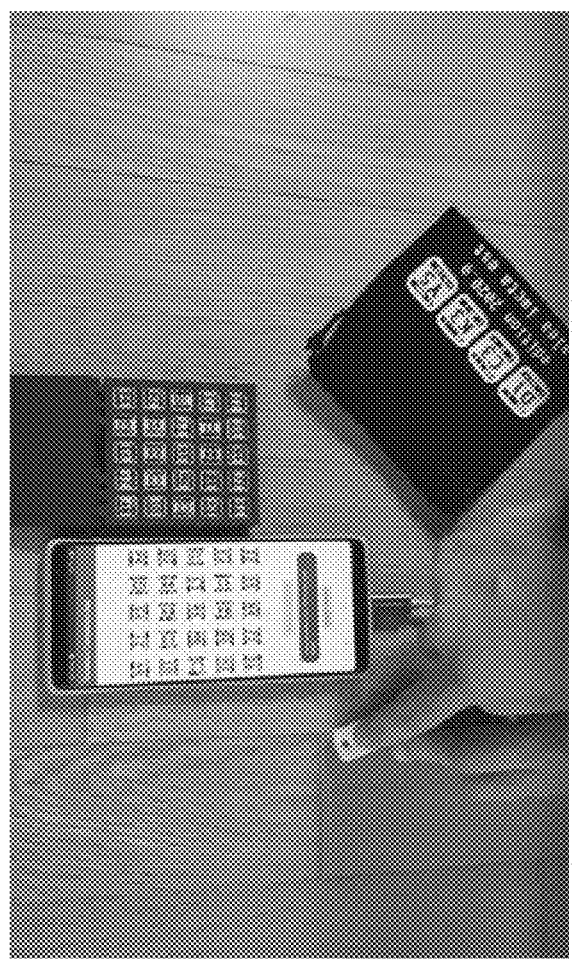
FIG. 4C is an example of using a generated cryptographic key to seed an authenticator device, in accordance with some embodiments.

FIGS. 4A, 4B, and 4C illustrate an example embodiment of using a secret derived from the cryptographic key to seed an authenticator device or application running an authentication-based or cryptographic protocol. For example, a user can seed the keys they carry around with them, such that if the user loses or misplaces one, it can be replaced with a cryptographically identical replica. In FIG. 4A, a user operates a smartphone running an application labeled a "Companion App" for the dice grid. The application is configured to capture an image of the dice grid, identify the images on the die faces, generate a cryptographic key, derive a secret from the cryptographic key, and seed an authenticator device. In the figure, the user is in the process of opening or unlocking the dice grid. The application has a user interface button for reading the dice grid. The smartphone additionally has an authenticator device connected via a cable. The authenticator device in this example is a FIDO-based token, but it can be a device running FIDO, WebAuthN, or any related authentication-based or cryptographic protocol. In some embodiments, instead of seeding an authenticator device, an authentication application is seeded. In some embodiments, the secret is any machine-readable secret data which can be generated from the cryptographic key. For example, a sequence of words based on the cryptographic key may be a secret.

In FIG. 4B, the user has opened the dice grid and taken a picture of the dice grid using the smartphone's built-in camera. The dice grid application then automatically identified the images on the die faces and displayed them on the smartphone screen. The user is now presented with user interface options to write the FIDO token, view the public key, or forget the dice grid.

In FIG. 4C, the user has chosen the option to write the FIDO token. The screen displays a prompt to press the button on the FIDO token. The user presses the button on the FIDO token, which generates a secret which is derived from the cryptographic key, then seeds the FIDO token with the secret.

Returning to FIG. 2B, at optional step 224, the system alternatively or additionally generates a password derived from the cryptographic key. FIGS. 5A-5F illustrate an example of using a cryptographic key to generate a password with a password manager.

Figure 5A:
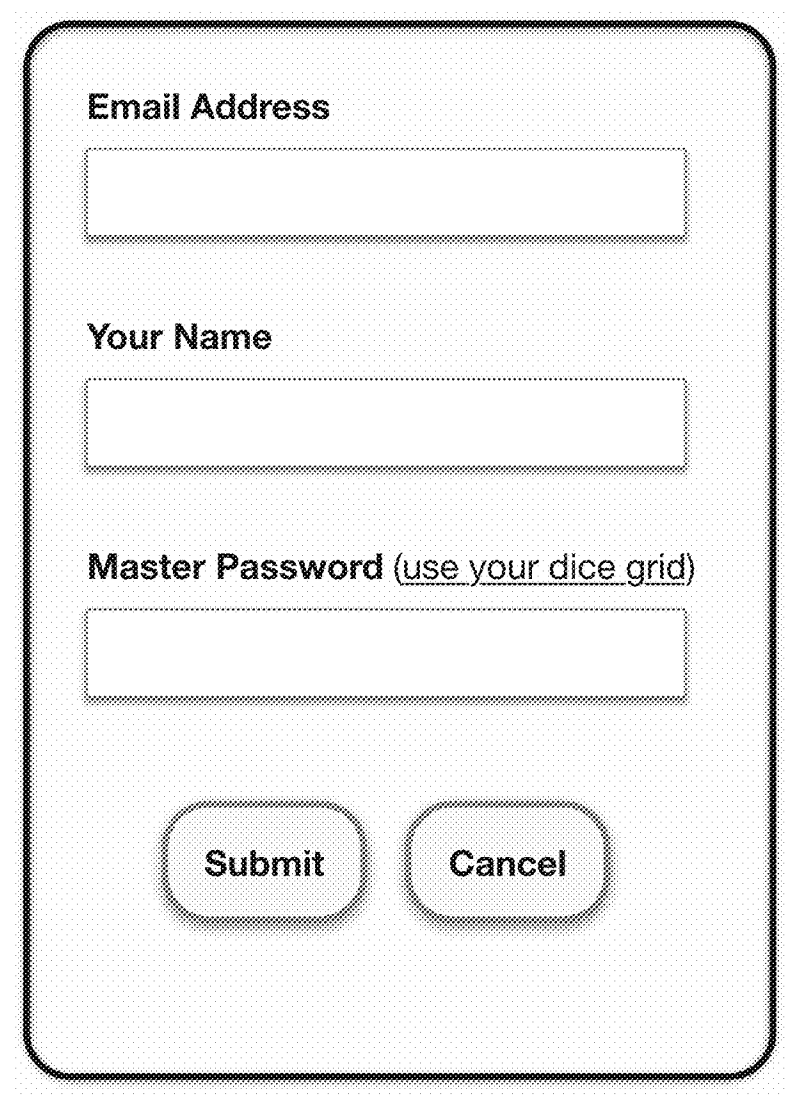
Figure 5B:
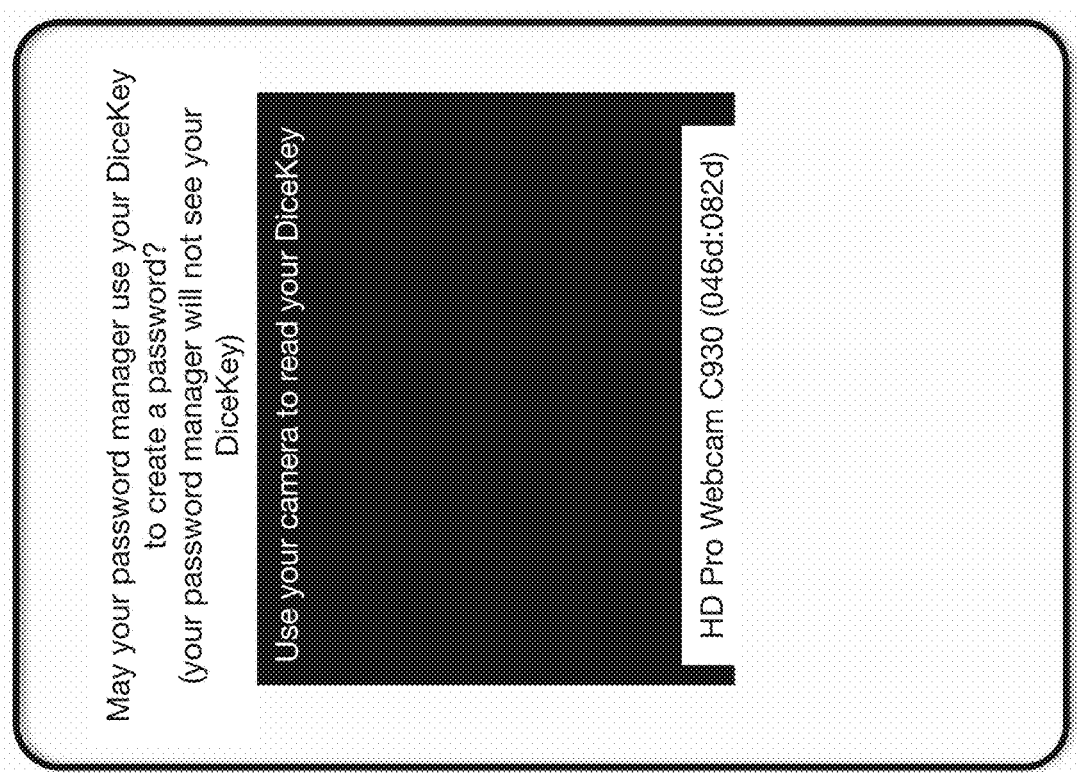
FIG. 5B is an example of using a generated cryptographic key to generate a password, in accordance with some embodiments.
Figure 5C:
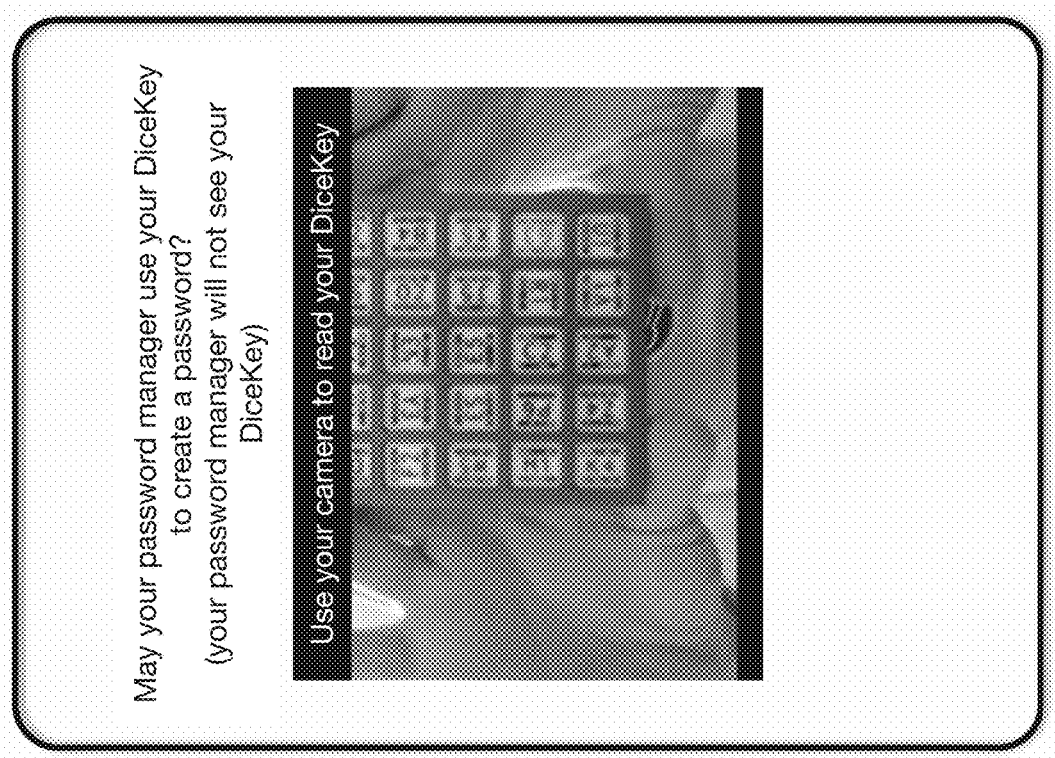
FIG. 5C is an example of using a generated cryptographic key to generate a password, in accordance with some embodiments.
Figure 5D:
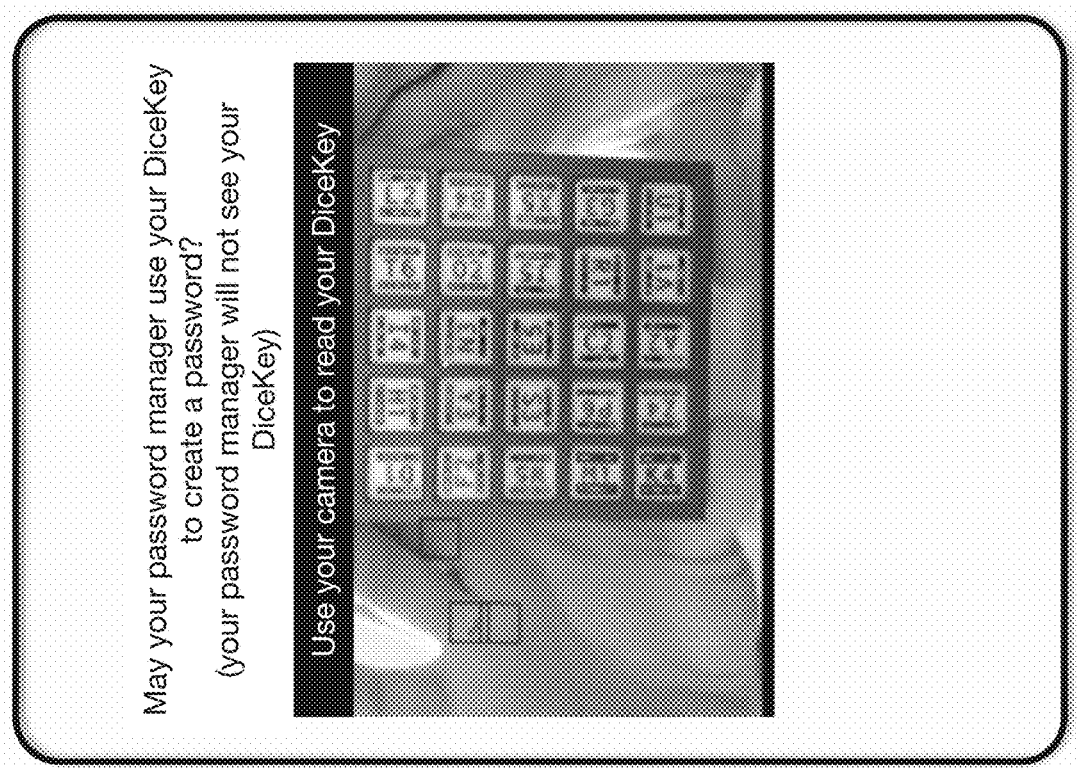
FIG. 5D is an example of using a generated cryptographic key to generate a password, in accordance with some embodiments.
Figure 5E:
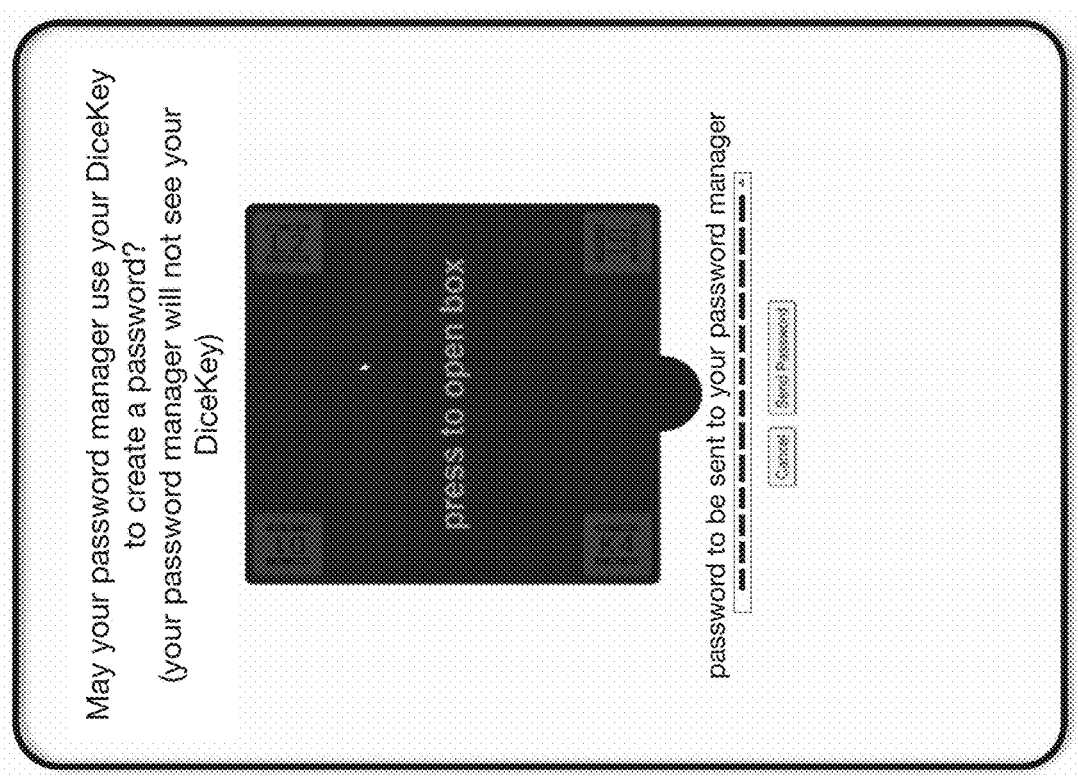
FIG. 5E is an example of using a generated cryptographic key to generate a password, in accordance with some embodiments.
Figure 5F:
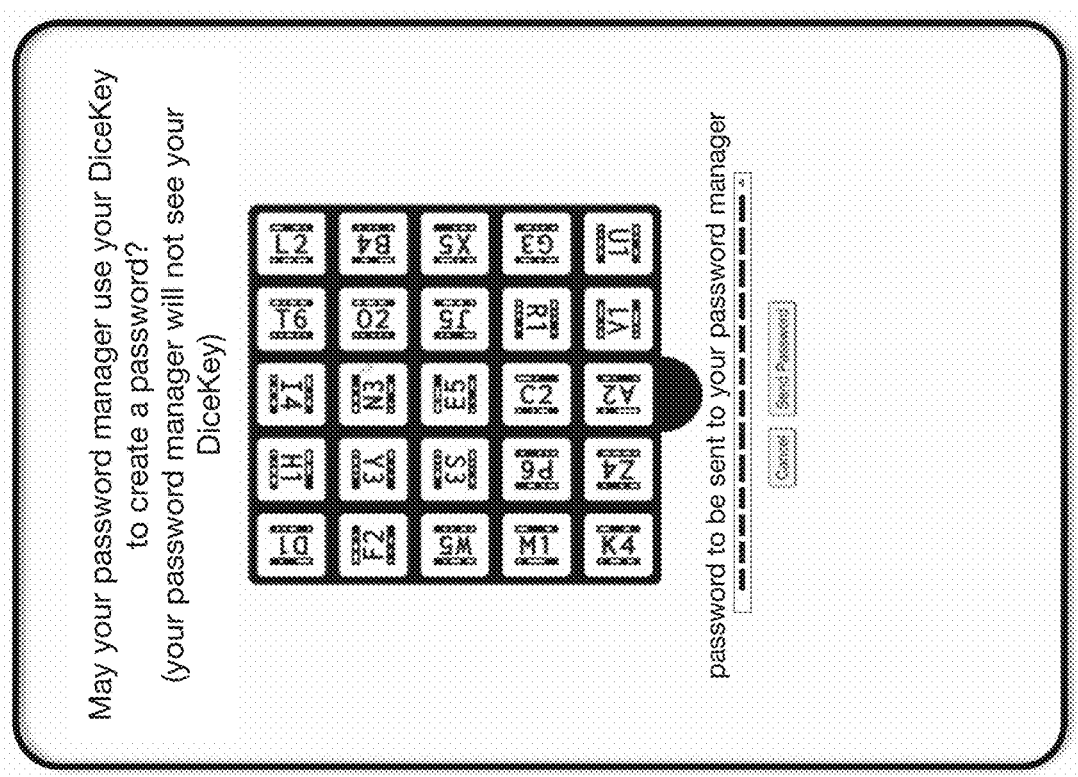
FIG. 5F is an example of using a generated cryptographic key to generate a password, in accordance with some embodiments.

FIG. 5A illustrates an example of a user interface of a password manager. A user is asked to enter their email address, name, and a master password, then can click "submit" or "cancel" as needed. For the master password, rather than typing in a password manually, the user can click on "use your dice grid". This link sends the user to a dice grid website or application, as shown in FIG. 5B. FIG. 5B illustrates a dice grid application and user interface. The screen reads, "May your password manager use your DiceKey [i.e., dice grid] to create a password? (Your password manager will not see your DiceKey)". The user is then able to take a picture of the dice grid using the device's built-in camera. FIG. 5C illustrates the user in the process of taking a picture of the dice grid with the built-in camera. FIG. 5D illustrates the system in the process of identifying the images on the die faces exposed on the dice grid, after capturing the image of the dice grid. FIG. 5E illustrates the dice grid application in a stage after it has completed the identification of the die faces, and has generated a cryptographic key. The user is given the option to send the password to the password manager. The user is also given the option to "open the dice grid" on the application itself. FIG. 5F illustrates the dice grid application when the user selects the option to open the dice grid. Upon clicking, the user is shown the dice grid with identified characters, overlines, and underlines as read in from the dice grid. In some embodiments, the user may be able to manually verify the information is correct, and modify the information if one or more aspects are inaccurate. FIG. 5G illustrates the user interface of the password manager after the master password has been generated based on the generated cryptographic key. In this case, a string of words has been generated as the master password, and has been derived from the cryptographic key. When the master password may be needed again, the user can re-derive the master password from the dice grid in the same way as illustrated.

Returning to FIG. 2B, at optional step 226, the system uses an application-specific cryptographic key, derived from the human- and machine-readable dice key, in an end-to-end encrypted application. In some embodiments, the application-specific cryptographic key is used as a primary authentication or encryption key for the end-to-end encrypted application. For example, the human- and machine-readable cryptographic key, as read from the dice grid, can derive a primary encryption key used directly to encrypt the application's data. In some embodiments, the application creates its own primary authentication key, and encrypts that primary key with an application-specific cryptographic key derived from the human- and machine-readable key, allowing the primary key to be recovered by decrypting it with the human and -machine readable dice key in the future. For example, the human- and machine-readable cryptographic key represented by the dice grid can be used to derive a public-private key pair for purposes of authentication. In some embodiments, the process may be similar to or share elements with the process illustrated in FIGS. 5A-5F and described above.

At optional step 228, the system uses an Application Programming Interface (API) to enable a third-party application to request the system to derive cryptographic keys or secrets, and to provide them to the application, or to request the system to perform cryptographic operations with derived secrets and to return the results to the application. In some embodiments, this is performed without the system enabling access by the third-party application to the human- and machine-readable cryptographic key or any derived keys. In some embodiments, the process may be similar to or share elements with the process illustrated in FIGS. 5A-5F and described above.

Figure 6:
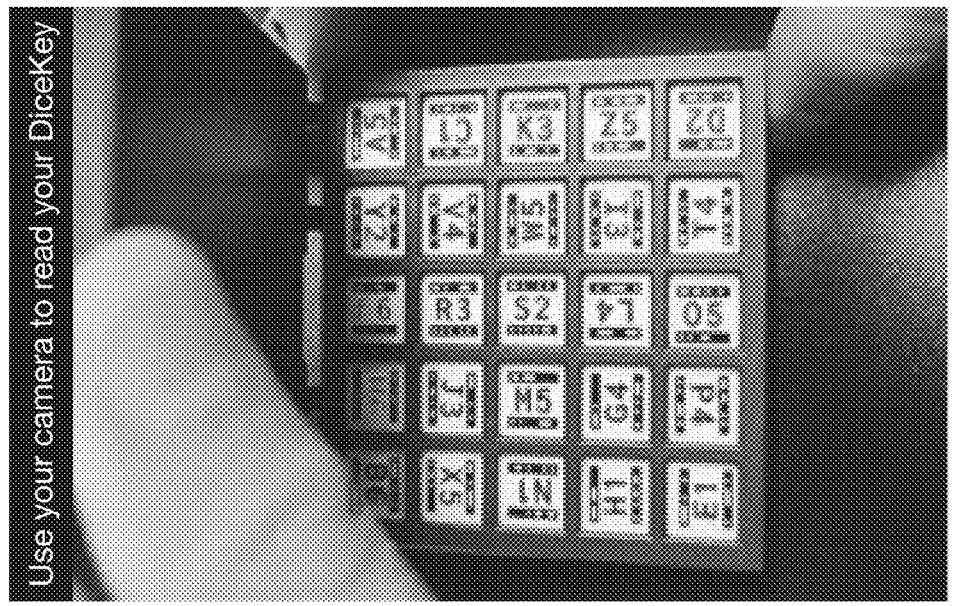
FIG. 6 is an example of error detection and correction during the process of providing a cryptographic key from dice, in accordance with some embodiments.

FIG. 6 illustrates an example of error detection and correction, in accordance with the described embodiments. The example shows a user attempting to take a picture of the dice grid in order for the system to capture an image of the dice grid. Toward the top left of the dice grid, the underline for B6, which appears above the overline since the die is up-side down, is covered by the user's thumb, but the camera appears to be able to see through the thumb to make out the outline of the underline. In this case, the algorithm has actually been able to read the overline (above the B6 on the logical die but below it in the frame), determine that it is in fact an overline (i.e., not an underline), then from that information and the dimensions and position of the overline, it extrapolates where the underline should be, and draws a red box there. It can then identify the "B6" based on reading the overline. Thus, even though there is user error of a thumb covering part of the image of a die face, the error detection of the system has used the underline and overline to detect the error and correct for it.

Figure 7:
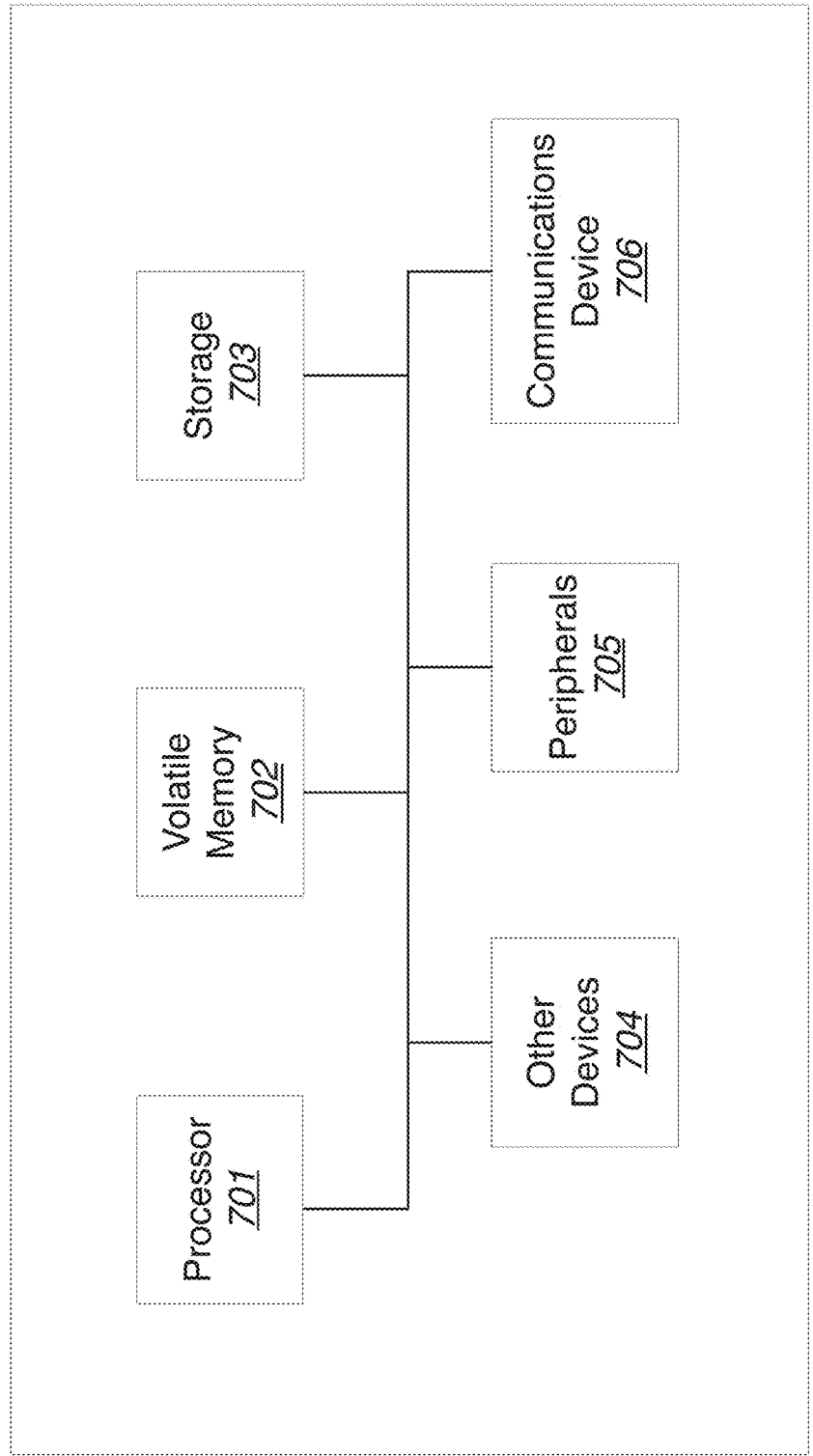
FIG. 7 is a diagram illustrating an exemplary computer that may perform processing in some embodiments.

FIG. 7 is a diagram illustrating an exemplary computer that may perform processing in some embodiments. Exemplary computer 700 may perform operations consistent with some embodiments. The architecture of computer 700 is exemplary. Computers can be implemented in a variety of other ways. A wide variety of computers can be used in accordance with the embodiments herein. In some embodiments, cloud computing components and/or processes may be substituted for any number of components or processes illustrated in the example.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 100 to an external medium. For example, communications device 706 may take the form of a network adapter that provides communications to a network. A computer 700 may also include a variety of other devices 704. The various components of the computer 700 may be connected by a connection medium 710 such as a bus, crossbar, or network.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method for providing a cryptographic key from dice, the method comprising:
    placing a plurality of dice into an arrangement to fill a dice grid, wherein the plurality of dice each contain a plurality of faces, wherein each of the die faces of the plurality of dice comprises an image;
    capturing, via a client device, an image of the arrangement;
    processing the captured image of the arrangement to identify each image on the die faces exposed on the dice grid; and
    generating a cryptographic key from the captured image of the arrangement and the identified images, wherein the cryptographic key is a representation of the arrangement in a canonical sequence, the cryptographic key providing security via one or more cryptographic methods.

2. The method of claim 1, wherein the arrangement contains:
    a position of each die within the dice grid,
    an exposed face of each die with respect to the front of the dice grid, and
    an orientation of the exposed face of each die relative to a frame of reference.

3. The method of claim 1, wherein the arrangement is generated via a random process.

4. The method of claim 1, further comprising:
    locking the arrangement of the dice grid such that the arrangement cannot be altered.

5. The method of claim 1, wherein the cryptographic key comprises one or more of: a binary representation of the arrangement, and a string representation of the arrangement.

6. The method of claim 1, wherein each image on the die faces comprises one or more letters, numbers, and/or symbols associated with a portion of the cryptographic key.

7. The method of claim 1, wherein each image on the die faces comprises an overline and/or an underline representing a plurality of data bits associated with a portion of the cryptographic key.

8. The method of claim 1, wherein the canonical sequence is based on a set of rules determining at least:
    a starting die within the dice grid,
    an upright position for each die based on the image exposed on the dice grid for that die, and
    a reading order from the starting die to an ending die within the dice grid.

9. The method of claim 1, wherein the dice grid is in the form of one of: a square or a rectangle.

10. The method of claim 1, wherein capturing the image of the arrangement comprises capturing, with the client device, an image of the dice grid in the arrangement.

11. The method of claim 1, further comprising:
    sending, to the client device, a prompt for a user to manually identify or verify one or more visible images on the die faces exposed on the dice grid based on the captured image of the arrangement.

12. The method of claim 1, further comprising:
    performing one or more error detection checks based on the captured image of the arrangement.

13. The method of claim 1, further comprising:
    using a secret derived from the cryptographic key to seed an authenticator device or application running an authentication-based or cryptographic protocol.

14. The method of claim 1, further comprising:
    generating a password derived from the cryptographic key.

15. The method of claim 1, further comprising:
    using an application-specific cryptographic key derived from the cryptographic key in an end-to-end encrypted application as a primary authentication or encryption key or to back up a primary authentication or encryption key.

16. The method of claim 1, further comprising:
    using an application programming interface (API) to enable a third-party application to derive keys or other secrets from the cryptographic key or perform operations with a derived cryptographic key without enabling access to the cryptographic key or the derived cryptographic key.

17. The method of claim 1, wherein the image on each of the die faces of the plurality of dice comprises:
    one or more text characters; and
    an encoding of data into a line below the text characters and a line above the text characters, such that the encoding in each individual line:
        replicates the data in the text, and
        contains information sufficient to determine the size and position of both the location of the text and the other line.

18. The method of claim 17, wherein the encoding of data comprises a plurality of 0 bits and a plurality of 1 bits, and wherein the method further comprises:
    generating an error correction code from the encoding of data, wherein the number of 0 bits and 1 bits in the encoding of data is constrained such that:
        all possible encodings have a minimum number of 0 bits and 1 bits, and
        a grayscale threshold is exceeded for one or more of the 0 bits and 1 bits in order to identify the lines as black or white.

19. The method of claim 17, wherein the encoding of data comprises a plurality of 0 bits and a plurality of 1 bits, and wherein the method further comprises:
    generating an error correction code from the encoding of data, wherein some of the pluralities of 0 bits and 1 bits are inverted copies of other bits so as to catch all errors in which the 0 bits and 1 bits in a region of the encoding of data are either falsely set as 1 to 0 or cleared as 0 to 1.

20. The method of claim 1, wherein the dice may have an arbitrary number of die faces.

21. The method of claim 20, wherein any single-faced dice are flat and comprise a side with a face and a side without a face, wherein any two-faced dice are flat and comprise two sides each having a face, and wherein any six-sided dice are represented as cubes with rounded corners.

22. A non-transitory computer-readable medium containing instructions for providing a cryptographic key from dice, comprising:
   instructions for placing a plurality of dice into an arrangement to fill a dice grid, wherein the plurality of dice each contain a plurality of faces, wherein each of the die faces of the plurality of dice comprises an image;
   instructions for capturing, via a client device, an image of the arrangement;
   instructions for processing the captured image of the arrangement to identify each image on the die faces exposed on the dice grid; and
   instructions for generating a cryptographic key from the captured image of the arrangement and the identified images, wherein the cryptographic key is a representation of the arrangement in a canonical sequence, the cryptographic key providing security via one or more cryptographic methods.

23. The method of claim 1, wherein the one or more cryptographic methods comprise one or more of: secure encryption, key generation, and hashing.

* * * * *